(12) United States Patent
Essig

(10) Patent No.: US 6,198,079 B1
(45) Date of Patent: Mar. 6, 2001

(54) CONTROL FOR AN ELECTRICAL APPLIANCE

(75) Inventor: Willy Essig, Böblingen (DE)

(73) Assignee: E. G. O. Elektro-Geratebau GmbH (DE)

( * ) Notice: Subject to any disclaimer, the term of this patent is extended or adjusted under 35 U.S.C. 154(b) by 0 days.

(21) Appl. No.: 09/425,634

(22) Filed: Oct. 22, 1999

(30) Foreign Application Priority Data

Oct. 24, 1998 (DE) .............................................. 198 49 075

(51) Int. Cl.$^7$ ....................................................... H05B 1/02
(52) U.S. Cl. .......................... 219/497; 219/506; 219/494; 219/483; 219/413; 340/825.72
(58) Field of Search ................................... 219/714, 506, 219/497, 412–414, 483–486, 494; 340/825.72, 825.69, 825.16, 825.36, 588, 589, 582, 557; 364/474.08, 474.06

(56) References Cited

U.S. PATENT DOCUMENTS

| | | | |
|---|---|---|---|
| 5,003,160 | * | 3/1991 | Matsuo et al. ........................ 219/494 |
| 5,710,409 | * | 1/1998 | Schwarzbacker et al. ........... 219/506 |
| 5,786,996 | * | 7/1998 | Vitkus et al. ......................... 219/506 |
| 5,998,769 | * | 12/1999 | Le Van Suu .......................... 219/506 |
| 6,043,461 | * | 3/2000 | Holling et al. ..................... 219/445.1 |

FOREIGN PATENT DOCUMENTS

| | | |
|---|---|---|
| 42 43 510 | 6/1994 | (DE) . |
| 196 15 357 | 11/1996 | (DE) . |
| 196 15 840 | 10/1997 | (DE) . |
| 296 22 066 | 5/1998 | (DE) . |
| 197 53 345 | 6/1998 | (DE) . |
| 0 846 991 | 11/1997 | (EP) . |

* cited by examiner

Primary Examiner—Mark Paschall
(74) Attorney, Agent, or Firm—Akerman Senterfitt

(57) ABSTRACT

The invention provides a control (15) for an electrical appliance (11) with at least one electrical operating device (13) contained in the appliance (11), the control (15) containing at least one power switching device (17). According to the invention the control (15) has a control unit (21) separate from the electrical appliance (11) and which is connected to the latter in wireless, signal-transmitting manner and essentially contains the control and regulating part for the electrical appliance. In this way an operating and control unit (21) separate or separable from the electrical appliance (11) is obtained and which when necessary can be easily inter-changed as a separate part. A basic version of an electrical appliance (11) can be upgraded with different control units (21) to a final appliance with differing operational scope. Preferably the electrical appliance is an electric cooker, particularly a hob. As a further function the external control unit (21) must be fitted in a specific position, particularly on the electrical appliance (11), in order to permit operation.

20 Claims, 1 Drawing Sheet

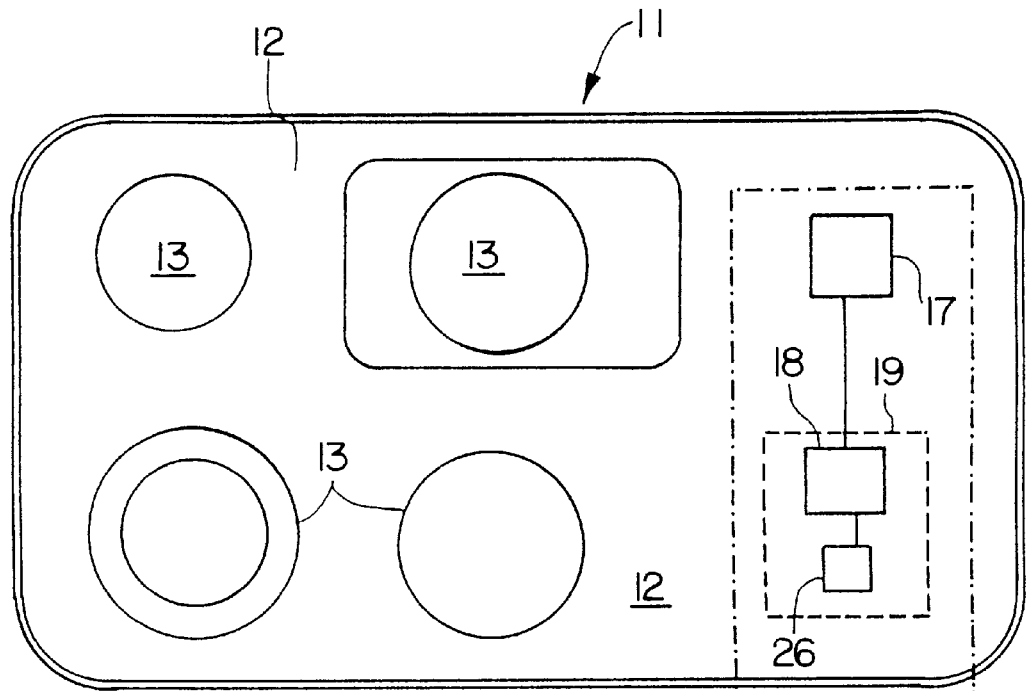
Fig.1
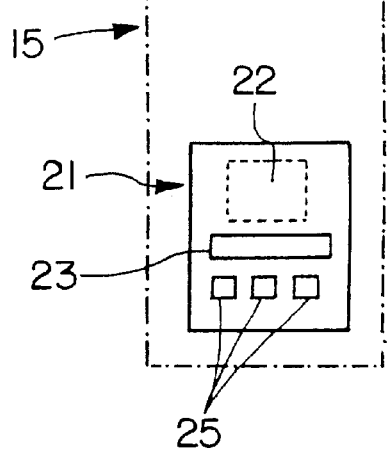

CONTROL FOR AN ELECTRICAL APPLIANCE

FIELD OF USE AND PRIOR ART

The invention relates to a control for an electrical appliance having at least one electrical functional device contained in the appliance, the control containing at least one power switching device. The invention is preferably used in an electrical heating appliance, particularly a domestic electric cooker or oven.

DE-U-296 22 066 proposes a domestic appliance with which is associated in an extension of the conventional type of construction at least one separate control and/or display element. From the operating principle standpoint, the latter can e.g. be likened to a remote control for a television, in which are contained control knobs or switches can be separated out from the actual appliance. Additionally there is here a bidirectional data transmission in order to be able to read off operation-relevant data on a display element separate from the electrical appliance.

In addition, e.g. DE 196 15 357 proposes solutions, in which there are only separate display elements for the operating state of the electrical appliance and which receive in stored form the program parameters set on the appliance and subsequently internally simulate and display the associated program or control sequence.

EP 846 991 describes a domestic appliance system with a central master computer for monitoring purposes. To improve information availability, said central monitoring system is linked with a mobile display device by a unilateral remote control technique.

DE 197 53 345 describes a possibility for the remote diagnosis of appliance defects. A display device supplies data relating to the defect by transmission means and telephone network to a diagnosis station, particularly a computer in a customer service centre or the like.

It is problematical in the prior art that known, separate control units or remote controls are designed in such a way that a specific combination thereof or control possibilities with an associated electrical appliance is fixed.

Problem and Solution

The problem of the invention is to provide an above-described control, which avoids the disadvantages of the prior art, improves the operation of the electrical appliances and makes available a multiplicity of applications.

This problem is solved by the features of claim 1. Advantageous developments of the invention form the subject matter of the subclaims and the following description.

According to the invention, the control has a control unit which is separate and can be removed from the electrical appliance and which is connected in wireless, signal-transmitting manner to the electrical appliance. Such wireless or contactless remote control techniques can e.g. incorporate a link with infrared or by electromagnetic waves. The separate control unit essentially contains the control and regulating part for the electrical appliance, which controls the at least one power switching device, which is preferably incorporated into the electrical appliance. Preferably the entire control and regulating part is located in the control unit with the exception of sensors or the like contained in the electrical appliance and which supply measurement and control quantities. Thus, there is a spatial subdivision of the control into a power switching part located in the electrical appliance and a control and regulating part located in the separate control unit.

It is possible to make the control unit freely manipulatable, so that it can be removed from the electrical appliance. This permits a very simple replacement of the control unit or the control and regulating part, more particularly without opening the electrical appliance or having to carry out complicated work, whilst a control can take place from a random location. The control unit can have a processing device, preferably at least one microprocessor. This processing device can essentially form the control and regulating part for the electrical appliance.

Advantageously with the control unit are associated input means for the inputting of control instructions and the like, particularly switches such as e.g. contact, rotary and/or pressure switches. Preferably the control unit with the input means is housed in a control part which, compared with conventional remote controls, can provide a high-quality remote control.

In addition, the control can have a memory, in which can be stored inter alia various program sequences for the control and/or parameters of evaluation functions of the electrical appliance. Such parameters of evaluation functions can e.g. be established and stored on setting up the electrical appliance. It is also possible to store series-specific data of the electrical appliance. Preferably the memory is located in the control unit or is directly associated with the processing device.

Transmission devices can be located in the electrical appliance and the control unit for the wireless signal transmission for or within the control. Preferably the transmission devices operate bidirectionally, which means that both a transmitting and a receiving device is incorporated both into the control unit and in the control part located in the electrical appliance. It is possible to associate with the control display means for displaying the operating state of the control and/or the electrical appliance and are preferably placed in the separate control unit. Display means can e.g. be simple illuminated, LC and alphanumeric displays.

The electrical appliance can be equipped with sensors for monitoring the operating state, e.g. of one of the functional units. The signals of such sensors can be supplied to the control or control unit and can thus e.g. form control loops for the electrical appliance, or said operating states can be displayed by display means to the control unit for informing a user.

The control and/or electrical appliance can have a position or location determination device for determining the spatial association of the control unit with the electrical appliance. The spatial association can e.g. be predetermined as at least one specific position of the control unit on the basis of direction/distance and this can essentially be a precise location or a limited area. It is possible to detect the control unit e.g. within a specific distance from the electrical appliance. An alternative can be a specific position of the control unit, particularly on the top of the electrical appliance or at a point freely accessible to a user. This specific position can be marked, e.g. optically by a coloured marking or by mechanical stops, notches or catches.

Such a position determination device e.g. makes it possible to only operate the electrical appliance with the control unit when the latter is in the specific position. This avoids wrong manipulations and an operation by an unintended user, e.g. by children playing on a domestic appliance. The control unit can be easily separated from the appliance and stored at a not readily accessible location.

One possibility is a contactless position determination device, particularly in wireless form with a transmitting device and a receiving device, the receiving device preferably being contained in the control unit. Contactless in the present context preferably means that the position determination takes place without any contact being required. The position determination device can e.g. operate in inductive manner.

An alternative to a position determination device can be a station and/or mounting support connected in signal-transmitting manner to the electrical appliance and/or the control and fitted at a predeterminable location and to which the control unit is to be fitted and the control is informed of this. A particularly simple detection of a control unit fitted to the station can take place by operated contacts.

Particularly in the case of a control unit to be fitted to the electrical appliance, holding or fastening means can be provided for toolless, detachable fixing in a specific position. These holding means can preferably have magnetic fastening means and/or magnetic orientation means. These can advantageously be fitted under smooth, unperforated surfaces such as e.g. glass surfaces or the like. The holding means can also be part of a position determination device for the control unit. In particular, an activation of the fixing or fitting of the control unit to the holding means can be the detection of the control unit in the specific position.

For power supply purposes the control unit can be provided with its own source, preferably a rechargeable energy store, such as an accumulator.

Preference is given to a power supply to which the control unit can be detachably connected, such a connection preferably requiring a specific spatial association of the control unit with the electrical appliance. Thus, the control unit can only operate if it is supplied with power and for this purpose it must be located in a specific position, as described. There can be wireless transmission devices for the signal transmission and power supply of the control unit and they preferably operate inductively. This avoids bare electric contacts. A double function of the transmission devices, e.g. with separate transmitting windows, reduces costs.

Particularly in the part contained in the electrical appliance, the control can contain a power switching device, which is constructed for cooperating with different control units or control unit types. These different control units in each case contain the control and regulating part for the electrical appliance and they can have different operating features with respect to the equipment, control possibilities, etc. It is possible in this way to provide both simple control units with pure control elements and also upgraded control units having additional functions such as timers, program sequences, etc. A basic version of an electrical appliance can in this way be subsequently and individually converted or upgraded and all the additional functions desired for upgrading purposes are implemented in the control unit.

In particularly preferred manner a control according to the invention can be incorporated into an electrical heating appliance with a cooking area or hob, which is made particularly from glass ceramic.

An above-described, separate control unit can be positioned at a predetermined location on the hob and can consequently act in the same way as a control unit fixed at this point. Advantageously the electrical appliance is only operable when the control unit is in this position. Another advantage of the present invention is that in the case of a wrong function or irreparable damage the complete electrical appliance with control does not have to be replaced and instead only the electrical appliance or control unit requires replacement.

The invention also includes a remotely controllable electrical appliance, particularly controllable with an above-described control, which contains at least one power switching device and which is substantially free from operating elements and/or control and regulating parts. It can be controlled with different types of control units by wireless signal transmission, said control units being constructed as units separate from the electrical appliance and contain all the control and regulating parts for the electrical appliance.

These and other features can be gathered from the claims, description and drawings and the individual features, both singly and in the form of subcombinations, can be implemented in an embodiment of the invention and in other fields and can represent advantageous, independently protectable constructions for which protection is claimed here. The subdivision of the application into individual sections and the subtitles in no way limits the general validity of the statements made thereunder.

BRIEF DESCRIPTION OF THE DRAWING

The drawing shows a preferred embodiment of the invention, which is described in greater detail hereinafter. The drawing diagrammatically shows an electric cooker with a control, which has a control unit separate from the electrical appliance.

DETAILED DESCRIPTION OF THE EMBODIMENT

The FIGURE shows an electric cooker 11 with a cooking area or hob 12, heating devices 13 and a control 15 according to the invention defined as a functional unit by the surrounding dot-dash lining. In the diagrammatic drawing the cooker 11 contains a power switching device 17 supplying power to one or all of the heating devices 13. The power switching device 17 receives its control instructions from the first transmission device 18 with which it is connected in the manner shown. The transmission device 18 is located under a broken line marking 19 in the right-hand, lower part of the hob 12.

With the electric cooker 11 or in particular the first transmitting device 18 is associated a separate control unit 21, which has a second transmitting device 22, shown in broken line form, a processing device 23 and input and output means 25. The second transmitting device 22 cooperates with the first transmitting device 18. The processing device 23 preferably has inter alia a microprocessor and a memory for parameters and/or operating sequences.

The input and output means 25 can have different switches, e.g. contact switches, as well as displays, e.g. illuminated or alphanumeric displays.

According to one construction in any position the control unit 21 can operate or control the electric cooker 11 by data transmission between the transmitting devices 18 and 22, as well as the power switching device 17. The control instructions and/or operating state of the electric cooker can be indicated or displayed on the input and output means 25. Preferably an operation is only possible if the control unit 21 is located on the marking 19. A locking or precise maintaining of the position can be achieved by stops or the like. Advantageously and alternatively a magnetic fixing is possible, which requires no interruptions of the smooth surface of the hob 12. It is possible to establish whether the control unit is in the predetermined operating position either by means of the transmitting devices 18 and 22 or by the fixing thereof to the marking 19, or, as shown, by a position determination device 26. The position determination device 26 can be a proximity switch, a mechanical switch, or e.g. an inductive sensor. Alternatively or additionally to a marking 19 on the hob 12, other locations are conceivable for the control unit 21 where an application can be established and used as a prerequisite for an operation of the electric cooker 11.

Function

As described hereinbefore, the control unit 21 preferably contains the entire control and regulating part for the electric cooker. Operation of the electric cooker 11 is only possible when the control unit 21 is in a desired geometrical position. This can on the one hand take place through an internal lock, e.g. in the processing device 23, whilst on the other it is possible to so construct the transmitting devices 18 and 22 with a marking 19 on the hob 12 as shown in the FIGURE, in such a way that they only have a limited operating span. This can e.g. be achieved by inductive transmission. In this way the control unit 21 must be located on the marking 19, possibly in a single, precise position, so that signal transmission can take place. Alternative transmission modes are infrared, ultrasonic, radio, etc.

In the case of a correctly applied and therefore released control unit 21, an operator inputs control instructions by means of the input means 25, which are transformed by the processing device 23 into switching instructions, which are supplied by the transmitting devices 22 and 18 to the power switching device 17, which operates the heating devices 13 in accordance with the instructions. The control instructions can be formed using information from the electrical appliance. At a control unit output means 25 is e.g. displayed a heating device 13 set at a particular level.

An advantage of the present invention is that in order to extend the multiplicity of functions of the electrical appliance 11, it is merely necessary to replace the separate control unit 21. A new control unit can e.g. have additional functions such as timers, automatic cooking or different program sequences, different pot or saucepan detection functions, etc. In this way it is easy to replace the determining part of the control 15.

With the electric cooker 11 or heating devices 13 can be associated not shown sensors, e.g. temperature sensors or protectors. By means of the temperature sensors it is e.g. possible to determine the temperature of a heating device 13 and supply same via the transmitting devices 18 and 22 to the control unit 21 or processing device 23. This information can be used for activating a hot indicator or display or for automatic cooking sequences. Protectors are also possible, which in a serious case can directly interrupt the power supply to the heating device.

A power supply of the control unit 21 can take place either through inserted batteries/accumulators or by an inductive supply when the control unit 21 is placed on the marking 19. Optionally an inductive power supply can take place in window operation by means of an inductive interface.

A single control unit 21 can be used for a complete appliance family (hob, oven, vapour extraction hood, microwave, etc.).

A change can take place either by switching at the control unit or by changing the marking or a given position. For rationalizing the manufacturing process it is possible to build up in standardized form a few basic models of electric cookers 11, which by means of different control units can give different quality or differently equipped electric cookers. This has the advantage that in particular the power switching devices 17 can be identically constructed for a plurality of different electric cookers.

On the electrical appliance can be left certain switching or display functions, e.g. a general on/off switch, state locking switches for a removal of the control unit in operation or a hot indicator for a hot heating device.

What is claimed is:

1. A control for an electrical appliance with at least one electric operating device contained in said electrical appliance, said control containing at least one power switching device, wherein:
    said power switching device is contained in said electrical appliance for supplying power to said electric operating device;
    said control has a control unit separate from said electrical appliance;
    said control unit is connected to said electrical appliance in a wireless, signal-transmitting manner; and
    said control unit entirely contains said control and regulating part for said electrical appliance so that there is a spatial subdivision of said control into a power switching part located in said electrical appliance containing said at least one power switching device, and said control and regulating part located in said separate control unit.

2. The control according to claim 1, wherein said control unit can be freely manipulated.

3. The control according to claim 1, wherein with said control unit are associated input means for inputting control instructions.

4. The control according to claim 3, wherein said control unit with said input means is housed in a control part.

5. The control according to claim 1, wherein said control has a memory, in which said memory it is possible to store different program sequences for said control or parameters of evaluating functions.

6. The control according to claim 5, wherein said memory is located in said control unit.

7. The control according to claim 1, wherein there is in each case one transmitting device for wireless signal transmission for said control and for said electrical appliance.

8. The control according to claim 7, wherein said transmitting devices are constructed in bidirectionally functioning manner.

9. The control according to claim 1, wherein said control and said electrical appliance have a position determination device for determining the spatial association of said control unit with said electrical appliance.

10. The control according to claim 9, wherein said spatial association is predetermined as at least one specific position of said control unit on the basis of direction and distance in relation to said electric appliance or said position determination device.

11. The control according to claim 10, wherein said at least one specific position of said control unit is on said electrical appliance.

12. The control according to claim 9, wherein there is provided a contactless position determination device with a transmitting device and a receiving device.

13. The control according to claim 12, wherein said position determination device operates on an inductive basis.

14. The control according to claim 1, wherein holding means are provided for the toolless, detachable fixing of said control unit to said electrical appliance in a specific position.

15. The control according to claim 14, wherein said holding means form part of a position determination device for said control unit and an activation of said holding means for fixing said control unit is a determination of said specific position of said control unit in relation to said electrical appliance or said position determination device.

16. The control according to claim 1, wherein with said control unit is associated a power supply to which said control unit is detachably connectable.

17. The control according to claim 16, wherein said connection of said control unit to said power supply gives a specific spatial association of said control unit with respect to said electrical appliance or said position determination device.

18. The control according to claim 1, wherein there is provided a power switching device for the cooperation with several different said control units incorporated into said electrical appliance, said different control units containing the control and regulating part for said electrical appliance and have different functional features with respect to equipment, control possibilities, etc. for said electrical appliance.

19. The control according to claim 1, wherein said control is incorporated into an electrical heating appliance with a hob, said separate control unit being positionable at a predetermined location on said hob and said electrical heating appliance is only operable when said control unit is in said location.

20. A remotely controllable electrical appliance, with at least one electric operating device contained in said electrical appliance, wherein:

said electrical appliance contains at least one power switching device for supplying power to said electric operating device;

said electrical appliance is free from at least one of (a) operating elements and (b) control and regulating parts;

said electrical appliance is controllable with different separate control units by wireless signal transmission, said separate control units are constructed separately from said electrical appliance; and said separate control units contain all control and regulating parts for said electrical appliance.

* * * * *